March 18, 1947.　　　E. S. HALL　　　2,417,487
CAM ENGINE
Filed March 18, 1944
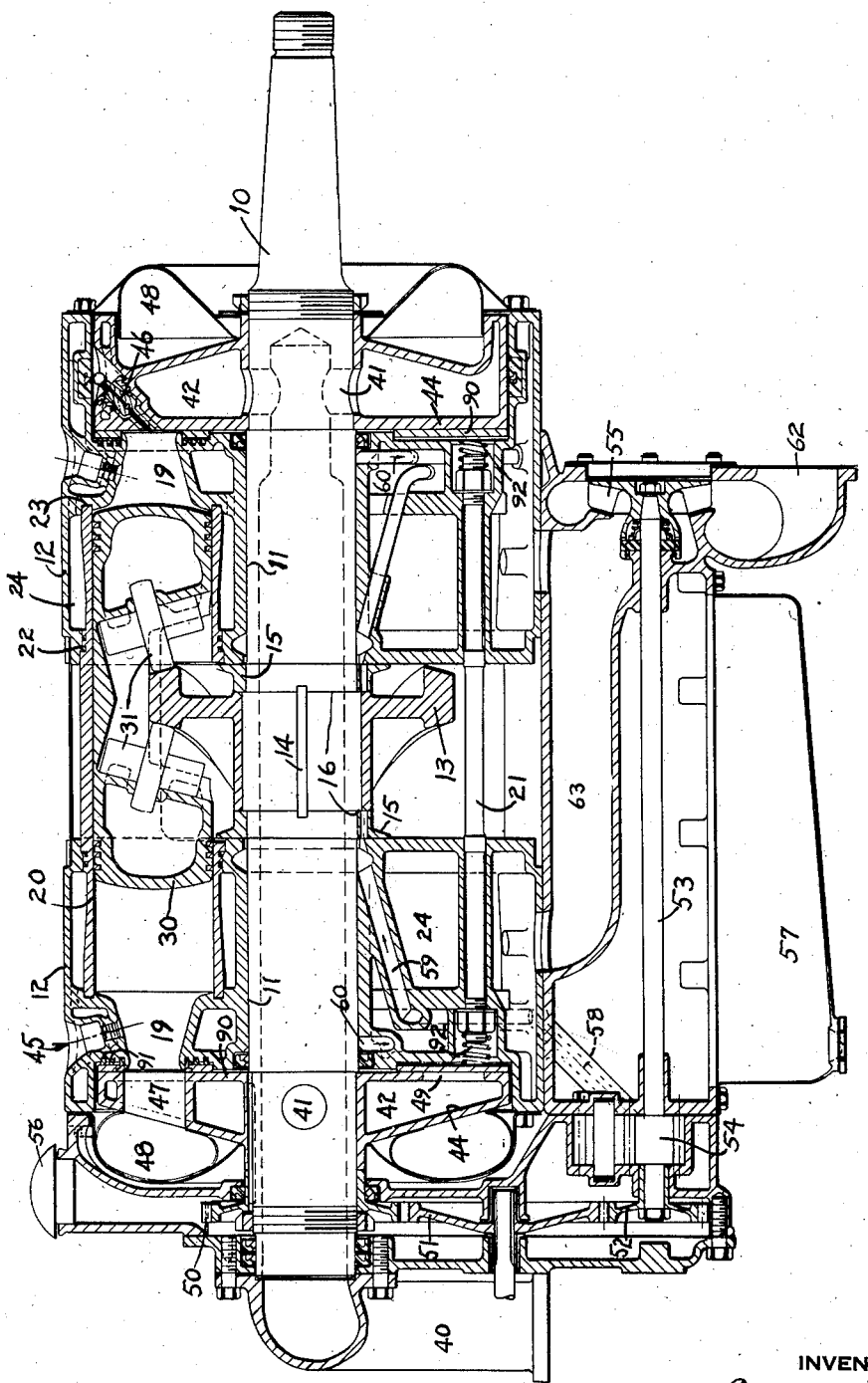
INVENTOR
Edwin S. Hall
BY Patented Mar. 18, 1947

2,417,487

UNITED STATES PATENT OFFICE 2,417,487

CAM ENGINE

Edwin S. Hall, Farmington, Conn.

Application March 18, 1944, Serial No. 527,033

7 Claims. (Cl. 123—58)

This invention relates to cam mechanisms. An object of the invention is to provide a practical and simple cam engine construction, low in manufacturing cost, and capable of long life in service.

Objects of invention are to provide a cam engine mechanism of relatively few parts, each easy to manufacture; to provide a simple mounting for the cam and thrust collars on the shaft, locking these members axially without any screw threads or nuts; to provide improved plate valve systems with a pair of valve plates secured to the main shaft and running with clearance relative to the cylinder blocks, with improved means for sealing the ports, the shaft and valve plates serving as intake manifold; to provide a simple construction for the fixed parts of the mechanism, with cylinder liners serving also as crosshead guides held between two cylinder blocks by thru-bolts, a construction in which the blocks, not having integral cylinder walls, are easily made by casting, or by welding or furnace brazing; and to provide a simple construction and arrangement of the accessory drives and oil sump, with minimum oil and water piping.

These and other objects of the invention will be more clear from the following description in connection with the drawings in which the figure is a longitudinal section of a simple cam engine mechanism in which the improved constructions of the invention are incorporated.

Referring to the drawings, shaft 10 is mounted in bearings 11 in cylinder blocks 12. Cam 13 is keyed against rotation on shaft 10 by key 14. The hub of cam 13 is exactly the same length as the enlarged portion of shaft 10 between shoulders 16, on which it fits. Collars 15 abut shoulders 16 and the ends of the hub of cam 13. Collars 15 may be press fits on shaft 10 and are keyed against rotation on shaft 10 by the ends of key 14. Collars 15 have thrust faces coacting with the inside faces of cylinder blocks 12. In operation, it is evident that shaft 10 and cam 13 are locked against axial movement by collars 15 and their thrust bearing coaction with the inner faces of blocks 12.

Cylinder liners 20 serve as wet liners in cylinder blocks 12, and as crosshead guides each connecting a pair of opposed cylinders. Cylinder blocks 12 are clamped together upon the several cylinder liners 20 by thru-bolts 21, with suitable packing rings 22 and 23 to seal the coolant in water jacket 24 from entry into the cylinders or cam case.

Piston members 30 are operable in the central crosshead guide portions of cylinders 20, the piston rings of piston members 30 operable in the cylinder portions of cylinder liners 20. Roller units 31 are journaled in half-journal bearings in piston members 30, being held in their bearings by cam 13 upon which they can roll.

Intake manifold 40, upon which a suitable carburetor may be hung, can feed mixture into hollow shaft 10, thence thru ports 41 to interiors 42 of rotary plate valves 44 fixed on and rotating with shaft 10. The mixture may pass into combustion chambers 19 thru ports 49. After combustion, exhaust may pass thru ports 47 to exhaust manifolds 48.

The seal of the rotary valves 44 relative to combustion chambers 19 and the valve housing is effected by valve sealing plates 90 lightly pressed against the faces of rotary valves 44 by springs 92 and by rings, similar to piston rings, mounted in concentric grooves in the outer faces of cylinder blocks 12.

Ignition may be by spark plugs in holes 45 or by spark plugs 46 carried by rotary valves 44. Since the cam 13 shown is a two-throw cam, the shaft 10 runs at half-speed relative to piston action, so that a single pair of ports 49 and 47 in each valve plate, and a single plug 46, would serve for four-stroke cycle operation. Two-stroke operation might be possible with two pairs of ports in each valve 44.

Operation of the mechanism as an engine is obvious to anyone familiar with the art, and need not be described further.

Accessories are driven by gear 50 on shaft 10, meshing with idler gear 51 which also runs at half-speed, driving gear 52 on lay shaft 53 driving oil pump 54 and water pump 55. Oil in sump 57 is pumped by pump 54 thru conduits 58 and 59 to main bearings 11 and the thrust faces of collars 15 from which oil is thrown out to lubricate rollers 31 and piston members 30. Drainage of oil is provided from the outer ends of main bearings 11 thru conduits 60 to sump 57, and oil from the cam casing also falls directly back into sump 57.

The breather passage from sump 57 is upward past gears 52, 51, and 50, and is covered by breather and filler cap 56.

Pump 55 drives coolant thru passage 62 to the radiator from which it returns to the top portions of cylinder blocks 12, draining back thru passage 63 to pump 55.

Having thus described the invention it will be clear that the objects as stated have been attained. Altho specific embodiments of the invention have been shown and described, it will be understood that the invention is widely ap- plicable and that changes in the arrangement and in the construction of the various parts may be made without departing from the spirit or scope of the invention as expressed in the following claims.

I claim:

1. In a cam engine mechanism having a shaft, a frame comprising two cylinder blocks having cylinders parallel to said shaft; and a rotary system comprising said shaft, a cam member mounted thereon between said cylinder blocks, thrust faces associated with said cam member and coacting with the inner faces of said cylinder blocks, and a pair of rotary plate valves secured to said shaft and running with clearance relative to the outer faces of said cylinder blocks; said rotary system operably mounted in bearings in said frame, said shaft and said rotary plate valves being hollow and forming together a connected conduit or manifold to distribute working medium to said cylinders.

2. In a cam engine mechanism having a shaft, a frame comprising cylinder blocks having cylinders parallel to said shaft; and a rotary system comprising said shaft, a cam member mounted thereon between said cylinder blocks, and a pair of rotary plate valves secured to said shaft and running with clearance relative to the outer faces of said cylinder blocks; said rotary system operably mounted in bearings in said frame; and means for sealing said plate valves comprising sealing plates contacting the inner faces of said valves, means for preventing rotation of said sealing plates, means lightly pressing said sealing plates against the working faces of said plate valves, and expandable rings in concentric grooves in said cylinder blocks and contacting said sealing plates.

3. In a cam engine mechanism having a shaft, a frame comprising cylinder blocks having cylinders parallel to said shaft, circular ports opening from said cylinders thru the outer faces of said cylinder blocks; and a rotary system comprising said shaft, a cam member mounted thereon between said cylinder blocks, and a pair of rotary plate valves secured to said shaft and running with clearance relative to the outer faces of said cylinder blocks; and means for sealing said plate valves comprising sealing plates contacting the inner faces of said valves, means for preventing rotation of said sealing plates, means lightly pressing said sealing plates against the working faces of said plate valves, and expandable rings surrounding said circular ports and contacting said sealing plates.

4. In a cam engine mechanism, a shaft, a cam on said shaft, a cylinder block supporting said shaft at each end of said cam, cylinder liners parallel to said shaft and connecting said cylinder blocks and forming wet liners in said cylinder blocks, and thru-bolts holding said cylinder blocks securely upon said liners.

5. In a cam engine mechanism, a shaft, a cam on said shaft, a cylinder block supporting said shaft at each end of said cam, cylinder liners parallel to said shaft and connecting said cylinder blocks and forming wet liners in said cylinder blocks, thru-bolts holding said cylinder blocks securely upon said liners, said blocks having cylindrical exteriors, a common oil sump or frame member fitting said cylindrical exteriors, and means forming a closure with said sump to enclose the space between said cylinder blocks in which said cam is operable.

6. In a cam engine mechanism, a shaft, a cam on said shaft, a cylinder block supporting said shaft at each end of said cam, cylinder liners parallel to said shaft and forming wet liners in said cylinder blocks and crosshead guides connecting said cylinder blocks, thru-bolts holding said cylinder blocks securely upon said liners, reciprocating piston members operable in said crosshead guides, and cam follower means operably connecting said piston members with said cam.

7. In an engine mechanism having a shaft and cylinders parallel thereto, a pair of cylinder blocks spaced apart, an oil sump member connecting said blocks and forming part of a closure to inclose the space between said cylinder blocks, an oil breather passage leading from said sump, and an accessory drive system comprising spur gears located in said breather passage, a lay-shaft driven by said gears and operably supported in said sump member, and pumps for oil and coolant driven by said lay-shaft.

EDWIN S. HALL.

REFERENCES CITED

The following references are of record in the file of this patent:

UNITED STATES PATENTS

| Number | Name | Date |
| --- | --- | --- |
| 2,205,953 | Hall | June 25, 1940 |
| 2,282,721 | Hall | May 12, 1942 |
| 1,338,185 | Looney | Apr. 27, 1920 |
| 1,345,940 | Looney | July 6, 1920 |
| 1,570,902 | Looney | Jan. 26, 1926 |
| 1,377,899 | De Lukacsevics et al | May 10, 1921 |
| 1,382,485 | De Lukacsevics | June 21, 1921 |
| 1,097,150 | Vallez | May 19, 1914 |
| 1,300,098 | Almen | Apr. 8, 1919 |